(12) United States Patent
Chiu (10) Patent No.: US 11,454,406 B2
(45) Date of Patent: Sep. 27, 2022

(54) DEHUMIDIFIER WITH FILTERING ASSEMBLY FOR SECONDARY TANK

(71) Applicant: NEW WIDETECH INDUSTRIES CO., LTD., New Taipei (TW)

(72) Inventor: Ming-Tsung Chiu, New Taipei (TW)

(73) Assignee: New Widetech Industries Co., Ltd., New Taipei (TW)

( * ) Notice: Subject to any disclaimer, the term of this patent is extended or adjusted under 35 U.S.C. 154(b) by 351 days.

(21) Appl. No.: 16/909,880

(22) Filed: Jun. 23, 2020

(65) Prior Publication Data
US 2021/0396403 A1    Dec. 23, 2021

(51) Int. Cl.
*F24F 3/14* (2006.01)
*B01D 53/26* (2006.01)

(52) U.S. Cl.
CPC .......... *F24F 3/1405* (2013.01); *B01D 53/265* (2013.01)

(58) Field of Classification Search
CPC .... B01D 53/265; F24F 2003/144; F24F 3/16; F24F 3/14; F24F 3/06; F24F 3/20; F24F 3/222
See application file for complete search history.

(56) References Cited

U.S. PATENT DOCUMENTS

| | | | |
|---|---|---|---|
| 11,226,118 B1 * | 1/2022 | Rodriguez | F24F 13/224 |
| 2008/0104988 A1 * | 5/2008 | Lee | F24F 13/222 62/285 |
| 2010/0000242 A1 * | 1/2010 | Chiu | F24F 1/022 62/150 |
| 2010/0293981 A1 * | 11/2010 | Jang | F24F 3/14 62/291 |
| 2012/0037004 A1 * | 2/2012 | Ulunov | F24F 1/0003 165/59 |
| 2015/0184875 A1 * | 7/2015 | Lee | F24F 13/222 62/93 |
| 2015/0241072 A1 * | 8/2015 | Kim | F24F 1/0323 236/44 C |
| 2016/0131372 A1 * | 5/2016 | Choi | F24F 3/1411 62/189 |
| 2016/0138816 A1 * | 5/2016 | Flaxer | F24F 6/10 261/119.1 |
| 2017/0045241 A1 * | 2/2017 | Chiu | F24F 13/20 |

(Continued)

FOREIGN PATENT DOCUMENTS

JP    2017053582 A  * 3/2017  ............... F24F 3/14

*Primary Examiner* — Nelson J Nieves
(74) *Attorney, Agent, or Firm* — Hershkovitz & Associates, PLLC; Abe Hershkovitz (57) ABSTRACT

A dehumidifier comprises a main body and a main tank. The main body has a water collector, a secondary tank, a filtering assembly, and a water pump. The water collector has an exhaust hole. The secondary tank is located under the water collector and has a receiving hole aligned to the exhaust hole. The filtering assembly has a filter located between the exhaust hole and the receiving hole, and aligned to the exhaust hole. An area of the filter is bigger than an area of the exhaust hole. The water pump has a drawing opening communicating with the secondary tank and a draining opening communicating with the main tank. Thus, the water flowing out the exhaust hole will definitely pass through the filter before flowing into the secondary tank. Therefore, the filtering assembly prevents the water pump from drawing water with dusts and impurities and being damaged.

13 Claims, 8 Drawing Sheets

(56) References Cited

U.S. PATENT DOCUMENTS

| | | | | |
|---|---|---|---|---|
| 2018/0071676 A1* | 3/2018 | Sakikawa | ............ | B01J 20/3425 |
| 2018/0195758 A1* | 7/2018 | Hou | ........................ | F25D 21/14 |
| 2018/0290103 A1* | 10/2018 | Choi | ..................... | F24F 13/222 |
| 2019/0212018 A1* | 7/2019 | Kim | ......................... | F24F 13/06 |
| 2019/0368771 A1* | 12/2019 | Yoon | ........................ | F24F 13/24 |
| 2019/0376701 A1* | 12/2019 | Jeong | ...................... | F24F 3/153 |
| 2020/0003451 A1* | 1/2020 | Yoon | ........................ | F24F 13/10 |
| 2020/0011551 A1* | 1/2020 | Williams | .................. | F24F 1/04 |
| 2020/0061531 A1* | 2/2020 | Yoon | .................... | B01D 53/265 |
| 2020/0271336 A1* | 8/2020 | Huang | ...................... | F24F 3/14 |
| 2020/0300531 A1* | 9/2020 | Barlettano | .............. | F24F 13/16 |
| 2020/0309391 A1* | 10/2020 | Ma | .......................... | F24F 1/022 |
| 2020/0309405 A1* | 10/2020 | Jang | ........................ | F24F 13/14 |
| 2021/0332992 A1* | 10/2021 | Zhang | ................... | B01D 53/265 |

\* cited by examiner

DEHUMIDIFIER WITH FILTERING ASSEMBLY FOR SECONDARY TANK

BACKGROUND OF THE INVENTION

1. Field of the Invention

The present invention relates to a home appliance, especially to a dehumidifier.

2. Description of the Prior Arts

An operating principle of a dehumidifier is basically the following: air is drawn into the dehumidifier from the environment via a fan, and then the air passes through a heat exchanger, and thereby moisture in the air is condensed and forms water drops. The water drops are first collected, and then are transported to a tank by a water pump. At the same time, the air that becomes dry and hot is exhausted out of the dehumidifier, so the humidity of the space is decreased.

In a current dehumidifier, the tank is arranged at a bottom part of the entire dehumidifier and should be separated from a main body of the dehumidifier laterally. However, after the tank is full, the user has to bend over to draw out the tank laterally, then lifts up the tank.

Because such structure makes it hard to separate the tank and the main body of the dehumidifier and the full tank is heavy, the aforesaid movement is prone to injure the user's waist or make the tank turned over. Furthermore, the air drawn into the dehumidifier is usually accompanied by dust and impurities, and the dust and the impurities will be mixed with the water drops when the moisture in the air is condensed in the radiator. As a result, the water pump will be blocked and damaged during transportation.

To overcome the shortcomings, the present invention provides a dehumidifier with a filtering assembly for a secondary tank to mitigate or obviate the aforementioned problems.

SUMMARY OF THE INVENTION

The main objective of the present invention is to provide a dehumidifier that has a tank laterally mounted on a main body and the tank can be separated from the main body by upward drawing. Besides, the dehumidifier further has a filtering assembly to prevent dusts and impurities from damaging the water pump.

The dehumidifier has a main body and a main tank. The main body has a radiator, a water collector, a secondary tank, a filtering assembly, and a water pump. The water collector is located under the radiator and has an exhaust hole. The secondary tank is located under the water collector and has a receiving hole and a secondary tank space. The receiving hole is aligned to the exhaust hole of the water collector. The secondary tank space communicates with the receiving hole. The filtering assembly has a filter. The filter is located between the exhaust hole of the water collector and the receiving hole of the secondary tank. The filter is aligned to the exhaust hole. An area of the filter is bigger than an area of the exhaust hole. The water pump has a drawing opening and a draining opening. The drawing opening communicates with the secondary tank space of the secondary tank. The main tank is detachably mounted on the main body and is located in a lateral side of the main body. The main tank is adapted to be moved upward with respect to the main body, thereby being detached from the main body. The main tank has a main tank space. When the main tank is mounted on the main body, the draining opening of the water pump of the main body communicates with the main tank space.

With the secondary tank located under the water collector, the secondary tank can temporally receive the dripping water. With the drawing opening of the water pump communicating with the secondary tank and the draining opening of the water pump communicating with the main tank space of the main tank, the water pump can draw the water from the secondary tank to the main tank. Therefore, the main tank may not be restricted by the gravity which limit the structural configuration that the main tank should be mounted at a lower end of a dehumidifier. As a result, the main tank can be mounted beside the main body and can be extracted with a vertical force, so the present invention facilitates ease in operating, prevents the main tank from being turned over, and avoids injuring a user's waist.

Moreover, with the filtering assembly located between the exhaust hole of the water collector and the receiving hole of the secondary tank, and with the filter aligned to the exhaust hole and the area of the filter being bigger than the area of the exhaust hole, the water flowing out the exhaust hole will definitely pass through the filter before flowing into the secondary tank. Therefore, the structure above prevents dusts and impurities from entering the secondary tank along with the condensed water drops, thereby preventing the water pump from drawing in water with dusts and impurities and being damaged.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
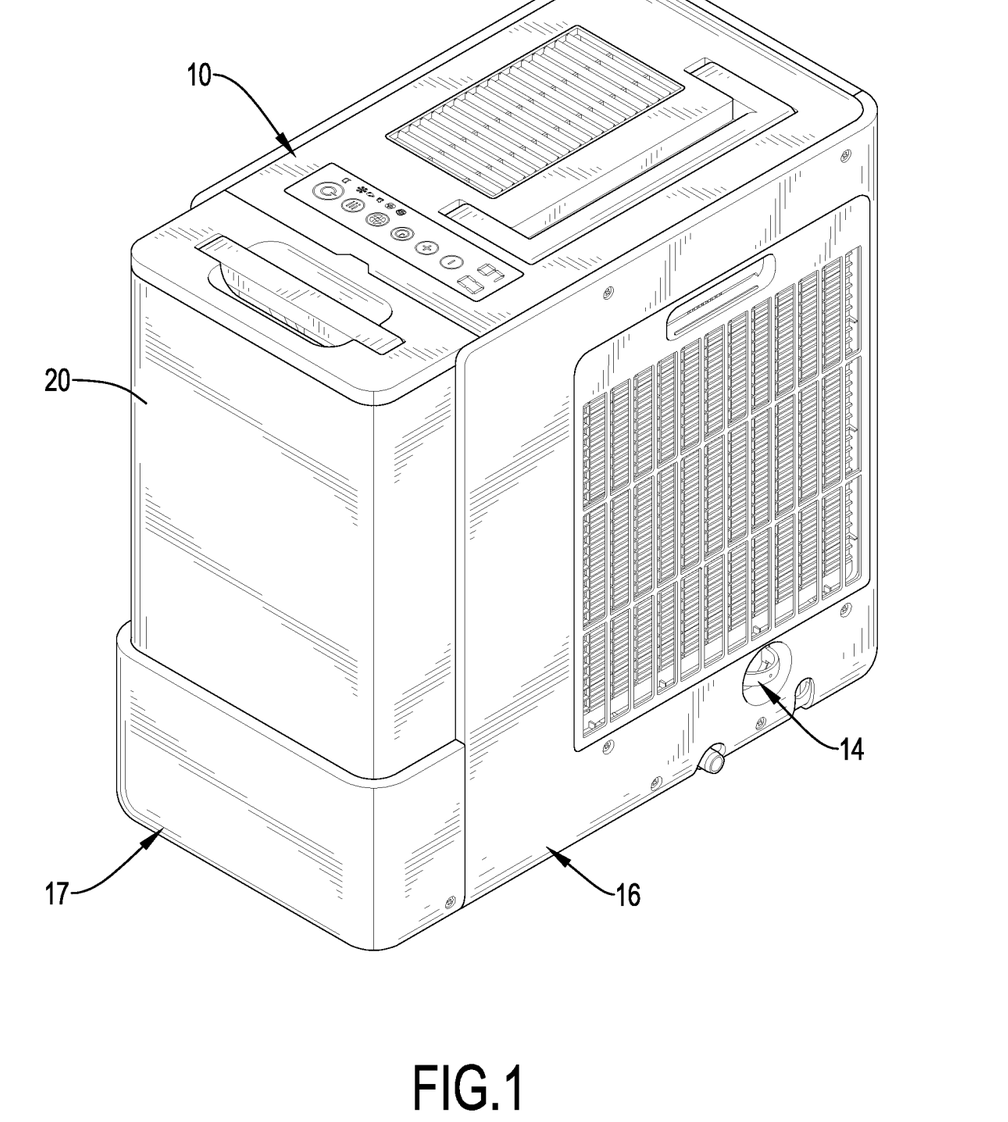
FIG. 1 is a perspective view of a dehumidifier in accordance with the present invention.
Figure 2:
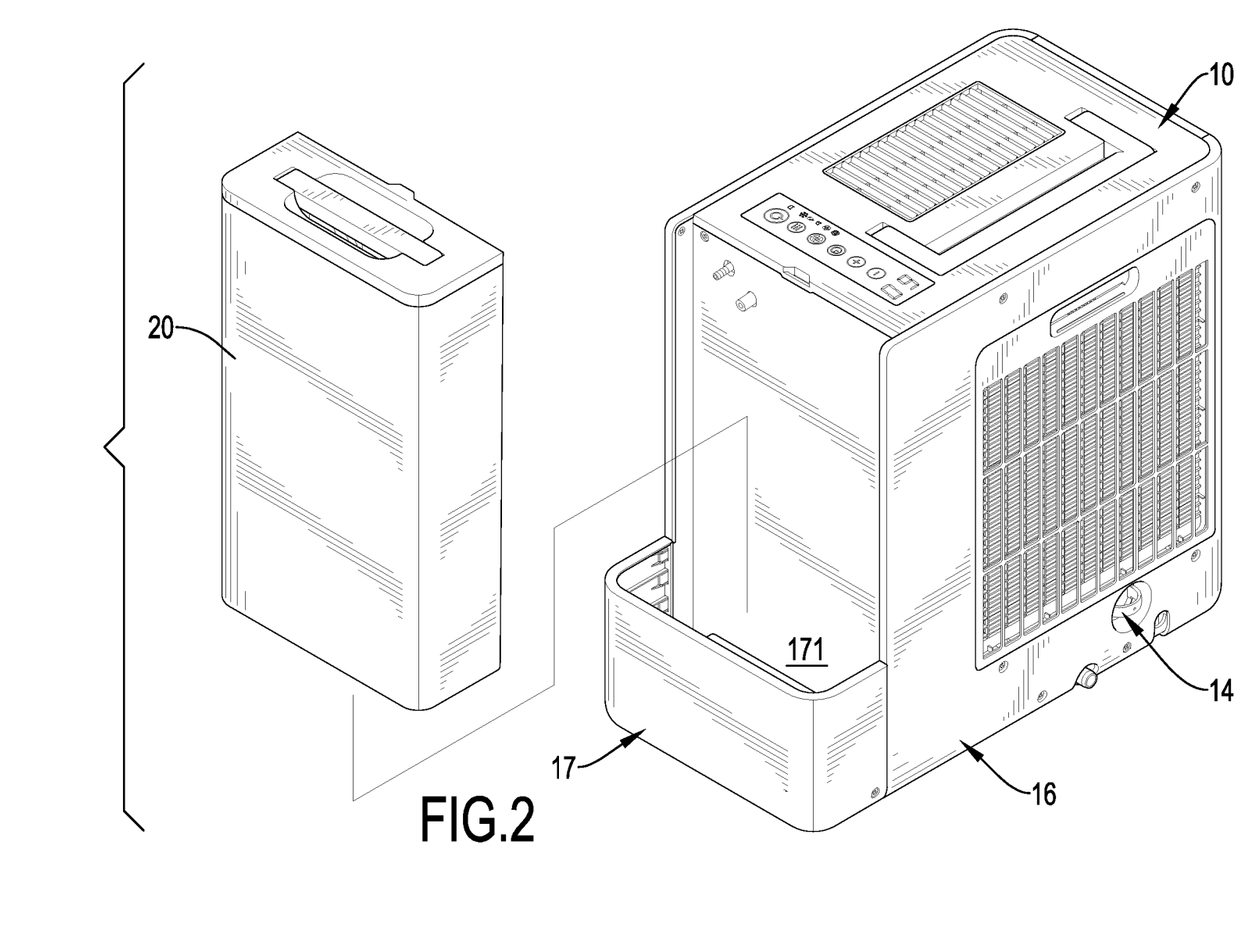
FIG. 2 is a perspective view of the dehumidifier in FIG. 1, showing a main tank detached from a main body.

With reference to FIGS. 1 and 2, a dehumidifier in accordance with the present invention comprises a main body 10 and a main tank 20.

Figure 3:
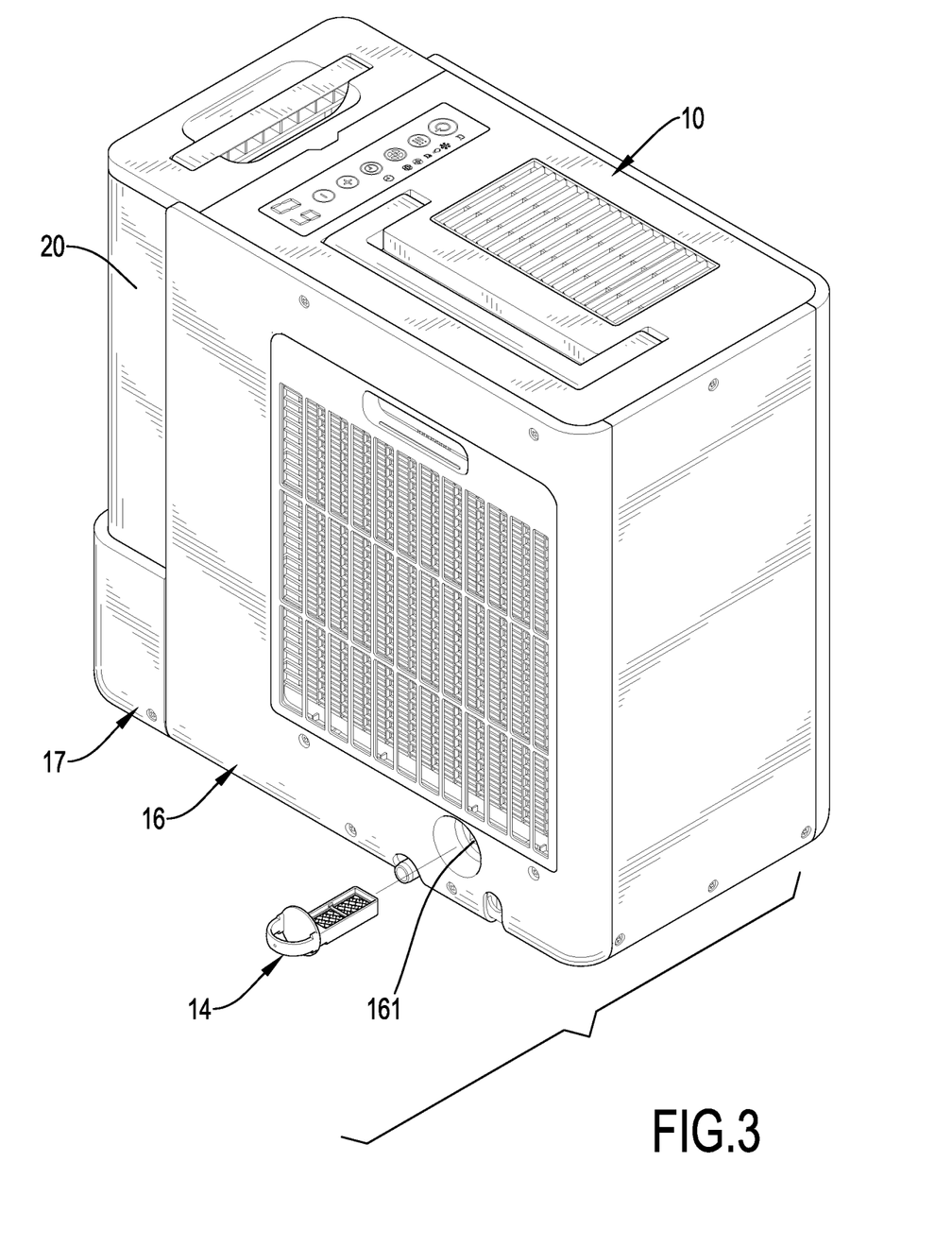
FIG. 3 is a perspective view of the dehumidifier in FIG. 1, showing a filtering assembly detached from a main body.
Figure 4:
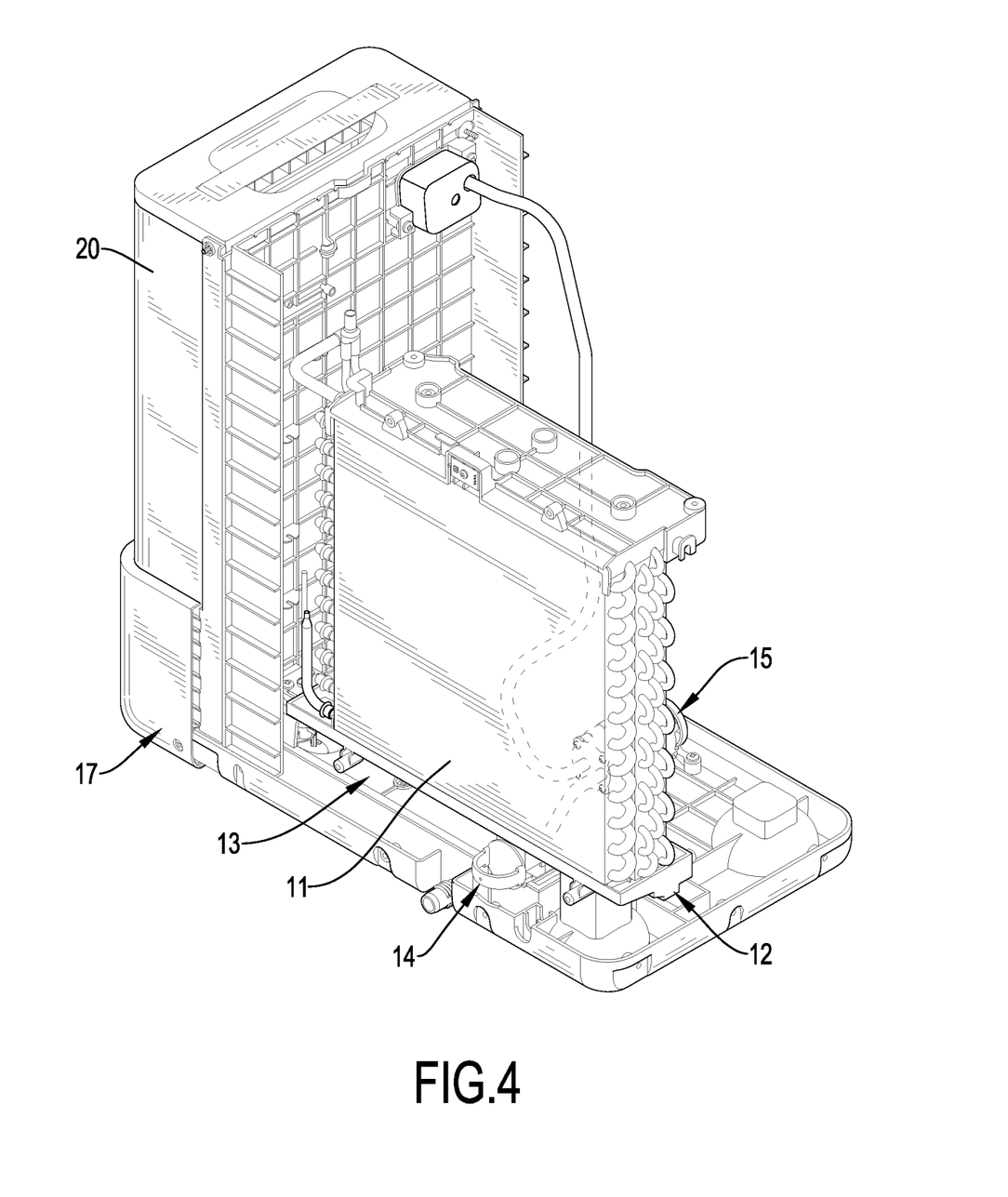
FIG. 4 is a perspective view of the dehumidifier in FIG. 1, showing the main body without a housing.

With further reference to FIGS. 2, 3, and 4, the main body 10 has a radiator 11, a water collector 12, a secondary tank 13, a filtering assembly 14, a water pump 15, a housing 16, and an enclosing wall 17.

Figure 5:
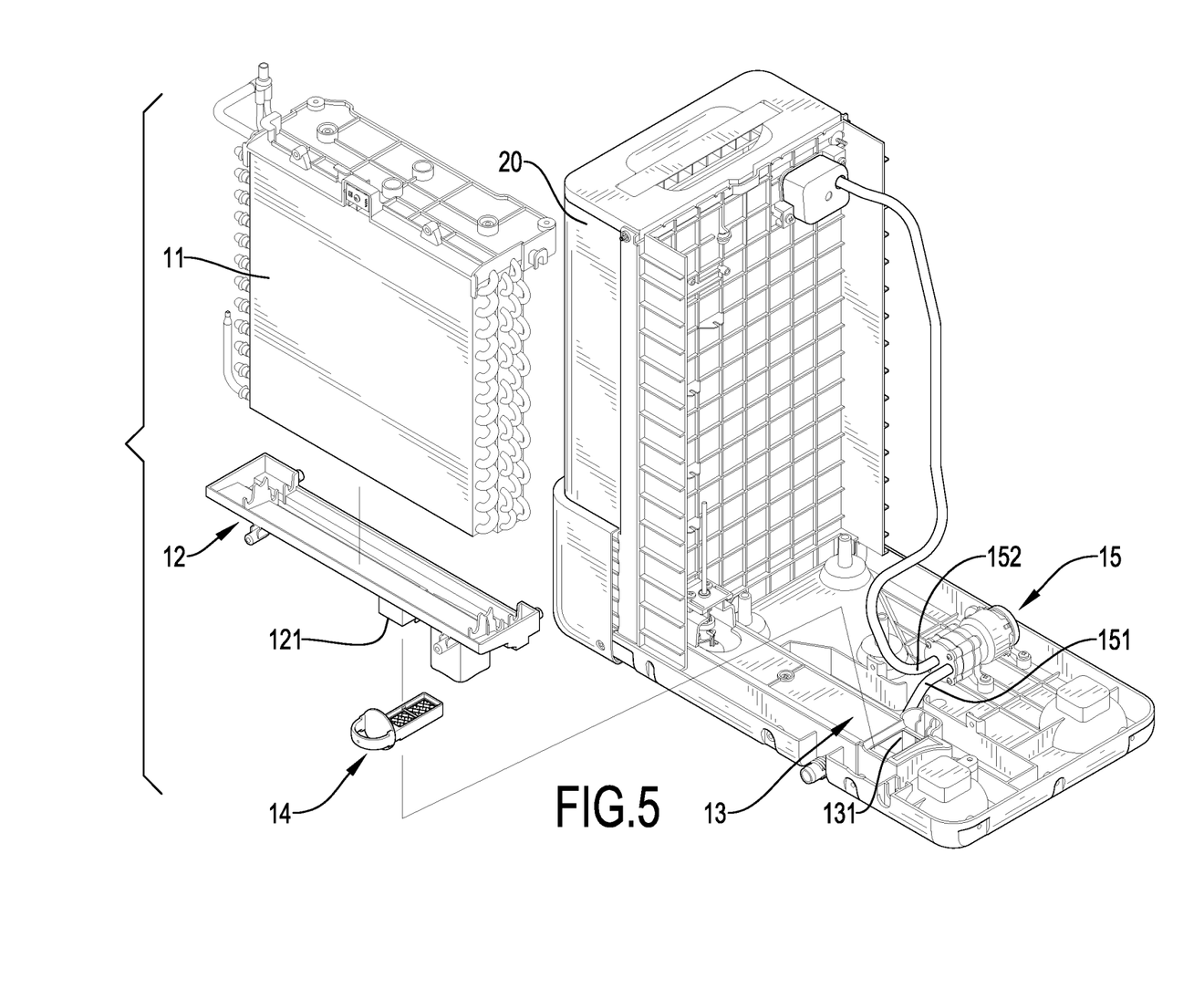
FIG. 5 is an exploded view of the dehumidifier in FIG. 1, showing components inside the main body.
Figure 8:
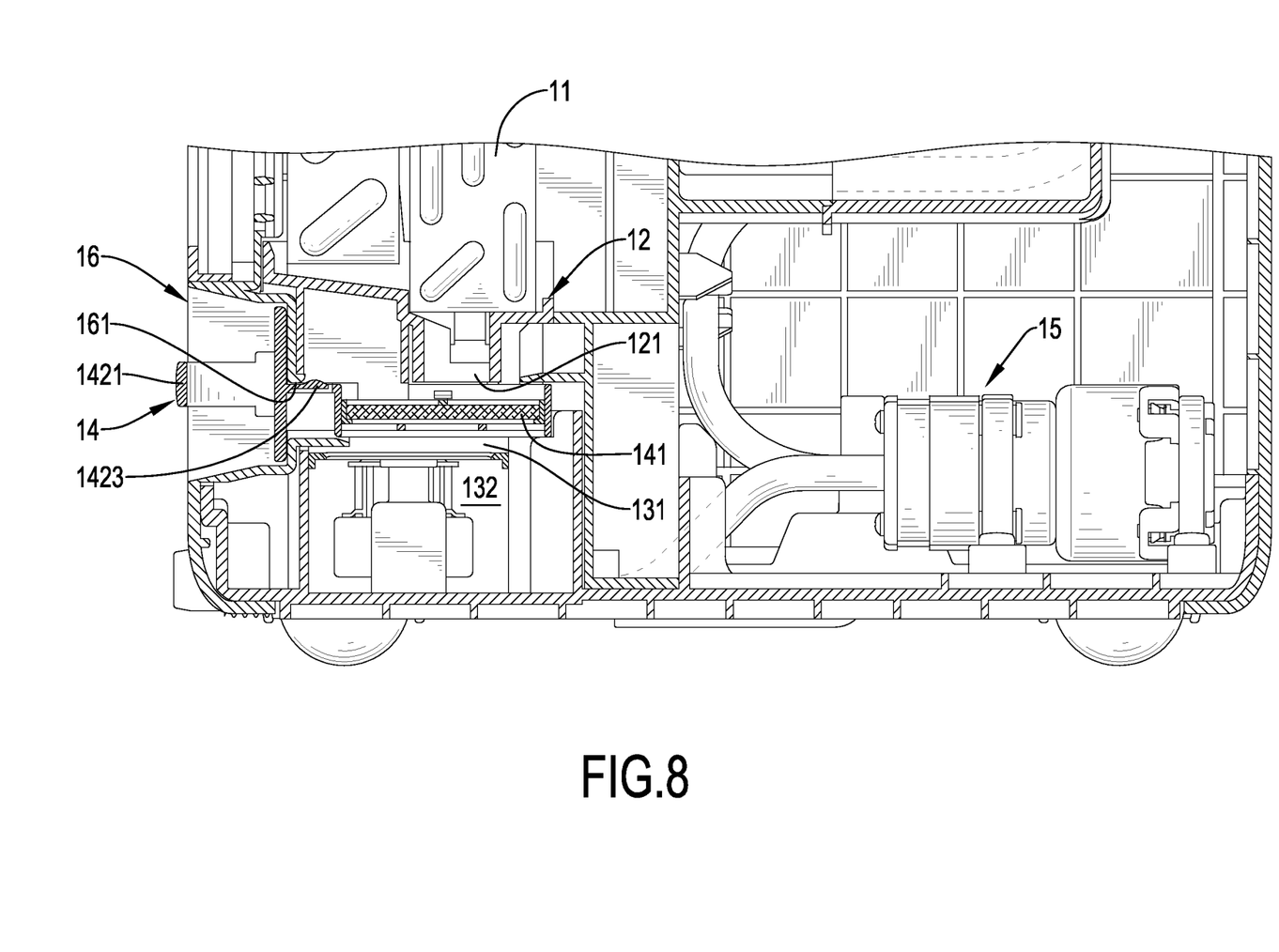
FIG. 8 is a side view in cross section of the dehumidifier in FIG. 1.

With further reference to FIGS. 5, and 8, the water collector 12 is located right under the radiator 11, and has an exhaust hole 121.

Figure 6:
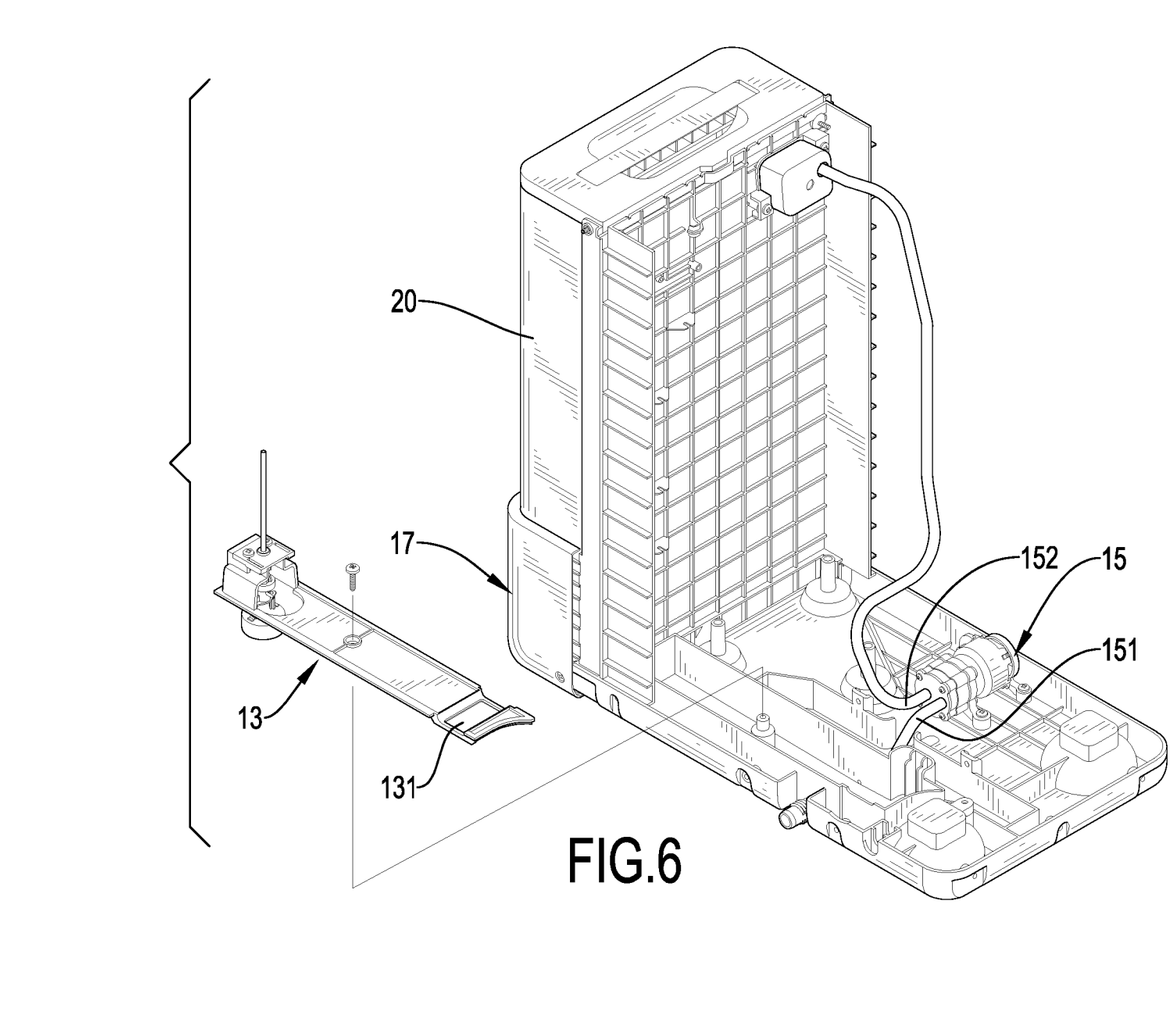
FIG. 6 is another exploded view of the dehumidifier in FIG. 1, showing components inside the main body.

With further reference to FIG. 6, the secondary tank 13 is located under the water collector 12, and has a receiving hole 131 and a secondary tank space 132. The receiving hole 131 is aligned to the exhaust hole 121 of the water collector 12. The secondary tank space 132 communicates with the receiving hole 131.

Figure 7:
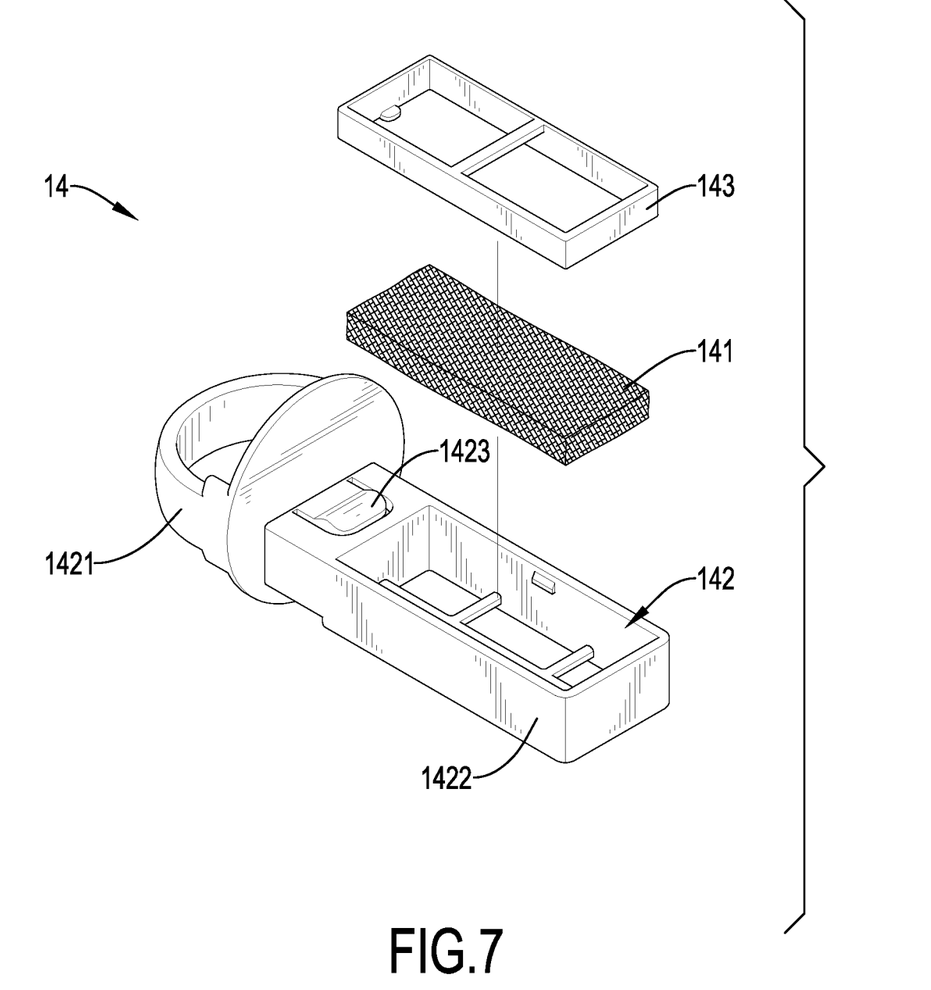
FIG. 7 is still another exploded view of the dehumidifier in FIG. 1, showing a filtering assembly.

With further reference to FIG. 7, the filtering assembly 14 has a filter 141. The filter 141 is located between the exhaust hole 121 of the water collector 12 and the receiving hole 131 of the secondary tank 13. The filter 141 is aligned to the exhaust hole 121, and an area of the filter 141 is bigger than an area of the exhaust hole 121.

The water pump 15 has a drawing opening 151 and a draining opening 152. The drawing opening 151 communicates with the secondary tank space 132 of the secondary tank 13.

With further reference to FIGS. 3 and 8, the housing 16 has an outer surface, a housing inner space, and a housing hole 161. The radiator 11, the water collector 12, the secondary tank 13, and the water pump 15 are located in the housing inner space. The housing hole 161 is formed on a lateral side of the housing 16 and communicates with the housing inner space. The housing hole 161 corresponds in position to the exhaust hole 121 of the water collector 12 and the receiving hole 131 of the secondary tank 13.

With reference to FIGS. 1 and 2, the enclosing wall 17 is laterally connected to the housing 16 and is located on a lateral side of the housing 16. The enclosing wall 17 and the outer surface of the housing 16 enclose a receiving space 171 therebetween.

The main tank 20 is detachably mounted on the main body 10 and located in a lateral side of the main body 10. The main tank 20 is adapted to be moved upward with respect to the main body 10, thereby being detached from the main body. Specifically, in this embodiment, the main tank 20 is upwardly detachably mounted in the receiving space 171, but it is not limited thereto. The main body 10 can also be implemented without the enclosing wall 17 and the receiving space 171 in another embodiment, and in this case the main tank 20 can be mounted on the lateral side of the main body 10 via any other buckling structure.

The main tank 20 has a main tank space. When the main tank 20 is mounted on the main body 10, the draining opening 152 of the water pump 15 of the main body 10 communicates with the main tank space.

With further reference to FIGS. 7 and 8, specifically, in this embodiment, the filtering assembly 14 further has a frame 142 and a fixing unit 143. The frame 142 is detachably mounted through the housing hole 161, and the filter 141 is detachably mounted on the frame 142 in this embodiment.

The frame 142 is detachably mounted between the exhaust hole 121 of the water collector 12 and the receiving hole 131 of the secondary tank 13, and the frame 142 has a pulling ring segment 1421, a frame body segment 1422, and an elastic buckler 1423.

The pulling ring segment 1421 is located outside the housing 16. The frame body segment 1422 is connected to the pulling ring segment 1421 and is moveably located in the housing inner space of the housing 16. Further, the frame body segment 1422 is selectively mounted between the exhaust hole 121 of the water collector 12 and the receiving hole 131 of the secondary tank 13, and the filter 141 is detachably mounted on the frame body segment 1422.

The elastic buckler 1423 detachably buckles a periphery of the housing hole 161 to stably mount the frame 142 in the housing hole 161 to prevent the frame 142 from easily detaching from the main body 10 due to a collision or vibrations during operation.

The fixing unit 143 is detachably mounted on the frame 142 and clamps the filter 141 with the frame 142.

Additionally, in this embodiment, the housing hole 161 corresponds in position to the exhaust hole 121 of the water collector 12 and the receiving hole 131 of the secondary tank 13 so that when the frame 142 is detachably mounted through the housing hole 161, the frame 142 is detachably mounted between the exhaust hole 121 of the water collector 12 and the receiving hole 131 of the secondary tank 13.

With the abovementioned structure of the filtering assembly 14 and the housing hole 161 of the housing 16, a user is allowed to pull out the filtering assembly 14 from the housing 16 through the housing hole 161 to replace the filter 141 without disassembling the housing 16.

With the secondary tank 13 located under the water collector 12, the secondary tank 13 can temporally receive the dripping water. With the drawing opening 151 of the water pump 15 communicating with the secondary tank 13 and the draining opening 152 of the water pump 15 communicating with the main tank space of the main tank 20, the water pump 15 can draw the water from the secondary tank 13 to the main tank 20. Therefore, the main tank 20 may not be restricted by the gravity which limits the structural configuration that the main tank 20 should be mounted at a lower end of a dehumidifier. As a result, the main tank 20 can be mounted beside the main body 10 and can be extracted with a vertical force, so the present invention facilitates ease in operating, prevents the main tank from being turned over, and avoids injuring a user's waist.

Moreover, with the filtering assembly 14 located between the exhaust hole 121 of the water collector 12 and the receiving hole 131 of the secondary tank 13, and with the filter 141 aligned to the exhaust hole 121 and the area of the filter 141 being bigger than the area of the exhaust hole 121, the water flowing out of the exhaust hole 121 will definitely pass through the filter 141 before flowing into the secondary tank 13. Therefore, the structure above prevents dusts and impurities from entering the secondary tank 13 along with the condensed water drops, thereby preventing the water pump 15 from drawing in water with dusts and impurities and being damaged.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A dehumidifier comprising:
  a main body having
    a radiator;
    a water collector located under the radiator and having an exhaust hole;
    a secondary tank located under the water collector and having
      a receiving hole aligned to the exhaust hole of the water collector; and
      a secondary tank space communicating with the receiving hole;
    a filtering assembly having
      a filter located between the exhaust hole of the water collector and the receiving hole of the secondary tank; the filter aligned to the exhaust hole; an area of the filter being bigger than an area of the exhaust hole; and a water pump having
  a drawing opening communicating with the secondary tank space of the secondary tank; and
  a draining opening; and
a main tank detachably mounted on the main body and located in a lateral side of the main body; the main tank adapted to be moved upward with respect to the main body, thereby being detached from the main body; the main tank having
  a main tank space; wherein when the main tank is mounted on the main body, the draining opening of the water pump of the main body communicates with the main tank space.

2. The dehumidifier as claimed in claim 1, wherein the filtering assembly further has
  a frame detachably mounted between the exhaust hole of the water collector and the receiving hole of the secondary tank; the filter detachably mounted on the frame.

3. The dehumidifier as claimed in claim 2, wherein the filtering assembly further has
  a fixing unit detachably mounted on the frame and clamping the filter with the frame.

4. The dehumidifier as claimed in claim 2, wherein the main body further has
  a housing having
    a housing inner space; the radiator, the water collector, the secondary tank, and the water pump located in the housing inner space;
    a housing hole formed on a lateral side of the housing and communicating with the housing inner space; the frame of the filtering assembly detachably mounted through the housing hole; the housing hole corresponding in position to the exhaust hole of the water collector and the receiving hole of the secondary tank so that when the frame is detachably mounted through the housing hole, the frame is detachably mounted between the exhaust hole of the water collector and the receiving hole of the secondary tank.

5. The dehumidifier as claimed in claim 3, wherein the main body further has
  a housing having
    a housing inner space; the radiator, the water collector, the secondary tank, and the water pump located in the housing inner space;
    a housing hole formed on a lateral side of the housing and communicating with the housing inner space; the frame of the filtering assembly detachably mounted through the housing hole; the housing hole corresponding in position to the exhaust hole of the water collector and the receiving hole of the secondary tank so that when the frame is detachably mounted through the housing hole, the frame is detachably mounted between the exhaust hole of the water collector and the receiving hole of the secondary tank.

6. The dehumidifier as claimed in claim 4, wherein the frame of the filtering assembly has
  a pulling ring segment located outside the housing;
  a frame body segment connected to the pulling ring segment and moveably located in the housing inner space of the housing; the frame body segment selectively located between the exhaust hole of the water collector and the receiving hole of the secondary tank; the filter detachably mounted on the frame body segment.

7. The dehumidifier as claimed in claim 5, wherein the frame of the filtering assembly has
  a pulling ring segment located outside the housing;
  a frame body segment connected to the pulling ring segment and moveably located in the housing inner space of the housing; the frame body segment selectively located between the exhaust hole of the water collector and the receiving hole of the secondary tank; the filter detachably mounted on the frame body segment.

8. The dehumidifier as claimed in claim 4, wherein the frame of the filtering assembly has
  an elastic buckler detachably buckling a periphery of the housing hole.

9. The dehumidifier as claimed in claim 7, wherein the frame of the filtering assembly has
  an elastic buckler detachably buckling a periphery of the housing hole;
  the elastic buckler formed on the frame body segment.

10. The dehumidifier as claimed in claim 1, wherein the main body further has
  a housing having
    an outer surface; and
    an enclosing wall laterally connected to the housing; the enclosing wall and the outer surface of the housing enclosing a receiving space therebetween; and
  the main tank is upwardly detachably mounted in the receiving space.

11. The dehumidifier as claimed in claim 3, wherein the main body further has
  a housing having
    an outer surface; and
    an enclosing wall laterally connected to the housing; the enclosing wall and the outer surface of the housing enclosing a receiving space therebetween; and
  the main tank is upwardly detachably mounted in the receiving space.

12. The dehumidifier as claimed in claim 4, wherein the housing of the main body has
  an outer surface;
  the main body further has
    an enclosing wall laterally connected to the housing; the enclosing wall and the outer surface of the housing enclosing a receiving space therebetween; and
  the main tank is upwardly detachably mounted in the receiving space.

13. The dehumidifier as claimed in claim 9, wherein the housing of the main body has
  an outer surface;
  the main body further has
    an enclosing wall laterally connected to the housing; the enclosing wall and the outer surface of the housing enclosing a receiving space therebetween; and
  the main tank is upwardly detachably mounted in the receiving space.

* * * * *